(12) United States Patent
Krog et al.

(10) Patent No.: US 7,823,456 B2
(45) Date of Patent: *Nov. 2, 2010

(54) PRESSURE SENSOR

(75) Inventors: Jens Peter Krog, Ulstrup (DK); Casper Pedersen, Koobenhavn (DK); Carsten Christensen, Bagsvaerd (DK)

(73) Assignee: Grundfos a/s, Bjerringbro (DK)

( * ) Notice: Subject to any disclaimer, the term of this patent is extended or adjusted under 35 U.S.C. 154(b) by 0 days.

This patent is subject to a terminal disclaimer.

(21) Appl. No.: 12/405,423

(22) Filed: Mar. 17, 2009

(65) Prior Publication Data

US 2009/0211362 A1    Aug. 27, 2009

Related U.S. Application Data

(63) Continuation of application No. 11/575,829, filed as application No. PCT/EP2005/008550 on Aug. 6, 2005, now Pat. No. 7,509,866.

(30) Foreign Application Priority Data

Sep. 24, 2004    (EP)    .................................. 04022866

(51) Int. Cl.
*G01L 1/02*    (2006.01)
(52) U.S. Cl. ............................... 73/716; 73/721; 73/726
(58) Field of Classification Search ........................ None
See application file for complete search history.

(56) References Cited

U.S. PATENT DOCUMENTS

| | | | |
|---|---|---|---|
| 4,141,253 A | 2/1979 | Whitehead, Jr. | |
| 5,058,435 A | 10/1991 | Terry et al. | |
| 5,184,515 A | 2/1993 | Terry et al. | |
| 5,544,529 A | 8/1996 | Mitani et al. | |
| 6,234,027 B1 | 5/2001 | Schatz | |
| 6,308,577 B1 | 10/2001 | Baskett et al. | |
| 6,642,594 B2 | 11/2003 | Kurtz | |
| 2003/0107095 A1 | 6/2003 | Kurtz | |
| 2003/0214003 A1 | 11/2003 | Kurtz | |

(Continued)

FOREIGN PATENT DOCUMENTS

| | | |
|---|---|---|
| CN | 1178900 | 4/1998 |
| EP | 0083496 B1 | 12/1986 |
| EP | 0833137 A2 | 4/1998 |
| EP | 1494004 A1 | 1/2005 |

*Primary Examiner*—Andre J Allen
(74) *Attorney, Agent, or Firm*—Panitch Schwarze Belisario & Nadel LLP

(57)    ABSTRACT

A pressure sensor is provided with a carrier (2), which in an inner region includes a membrane (4) on which at least one first measurement element ($R_{1-}$) for detecting a pressure impingement of the membrane (4) is arranged. Additionally, at least one second measurement element ($R_{3-}$) for detecting a pressure impingement of the membrane (4) is arranged on the membrane. The first measurement element ($R_{1-}$) and the second measurement element ($R_{3-}$) are arranged distanced differently far from the edge of the membrane. The output signals of the first and the second measurement element ($R_{1-}$, $R_{3-}$) are evaluated together in a manner such that the two measurement elements ($R_{1-}$, $R_{3-}$) detect a differential pressure acting on the membrane (4), and thereby compensate the influence of the system pressure acting on both sides of the membrane (4).

16 Claims, 13 Drawing Sheets

U.S. PATENT DOCUMENTS

| | | |
|---|---|---|
| 2004/0015282 A1 | 1/2004 | Babala et al. |
| 2004/0020305 A1 | 2/2004 | Kurtz et al. |
| 2004/0187588 A1 | 9/2004 | Miyazawa |
| 2005/0081637 A1 | 4/2005 | Kurtz et al. |
| 2006/0219021 A1 | 10/2006 | Kurtz et al. |
| 2007/0113665 A1 | 5/2007 | Johnson |

PRESSURE SENSOR

CROSS-REFERENCE TO RELATED APPLICATIONS

This application is a continuation application of U.S. patent application Ser. No. 11/575,829, filed on Aug. 2, 2007, currently pending, entitled "Pressure Sensor," which is a Section 371 of International Application No. PCT/EP2005/008550, filed Aug. 6, 2005, which was published in the German language on Apr. 6, 2006, under International Publication No. WO 2006/034751 A1, the entire contents of all of which are incorporated herein by reference.

BACKGROUND OF THE INVENTION

The invention relates to a pressure sensor, in particular to a differential pressure sensor.

Such a pressure sensor is for example known from EP 0 083 496 B1 or from the European Patent application 03 015 055. These differential pressure sensors are formed from a semiconductor substrate, which is thinned in an inner region into a membrane. Four measurement resistances are arranged in this inner region, which are connected into a measurement bridge, so that one may detect the pressure prevailing on both sides of the membrane as a differential pressure by way of the deformation of the membrane.

It is furthermore known from the mentioned state of the art to arrange additional compensation resistances on the semiconductor substrate which surrounds the membrane as a carrier and which does not deform under the action of the differential pressure, in order to eliminate influences caused by temperature, as well as influences of the system pressure which prevails on both sides of the membrane and which acts on the periphery of the membrane on the end-sides of the carrier.

This construction however has disadvantages. Thus, the compensation resistances on the substrate must be arranged as far as possible from the membrane, in order to exclude influences on the compensation resistances due to the differential pressure acting on the membrane. This enlarges the construction of the pressure sensor. Since the compensation resistances are not subject to any influence of the differential pressure, when they are connected to the measurement resistances on the membrane, they increase the total resistance of the circuit in a purely passive manner; by which means the measurement accuracy for measuring the differential pressure is worsened.

BRIEF SUMMARY OF THE INVENTION

It is therefore the object of the invention to provide an improved pressure sensor with increased measurement accuracy and a small construction. This object is achieved by a pressure sensor with the features specified in claim 1. Preferred embodiments are to be deduced from the dependent claims, the description and the figures.

The pressure sensor according to the invention comprises a carrier which for example consists of a semiconductor substrate, and a membrane is formed in its inner region. This membrane in the known manner, may be formed as one piece with the carrier by thinning the semiconductor substrate in the middle region. A first measurement element is arranged on the membrane for detecting a deformation by way of pressure impingement of the membrane. The measurement element may for example be a measurement resistance which functions in a piezoresistive manner. Such measurement resistances may, in the known manner, be formed by way of doping the semiconductor material in the membrane itself, in order to detect stresses or strains in the membrane. For example, a silicon monocrystal with surfaces in the <100>-level may be applied as a semiconductor substrate. The measurement resistances or strain recorders are preferably formed in the membrane with n-doping. Alternatively, in the known manner, a measurement element reacting to strain is deposited onto the surface of the membrane. A strain measurement strip of polysilicon may be used for example. According to the invention, apart from the first measurement element, at least one second measurement element is provided, which is likewise arranged on or in the membrane. This measurement element may be designed in the semiconductor material of the membrane itself, according to the first measurement element, or arranged as a measurement element on the membrane surface. This measurement element is also arranged such that it serves for detecting a pressure impingement of the membrane. The membrane deforms with a pressure impingement, which may be detected by the first and second measurement element in the form of strains or changes of stresses in the membrane, or on the membrane surface.

According to the invention, the first and the second measurement element are arranged on the membrane, such that the first measurement element and the second measurement element are distanced differently far from the edge of the membrane. This means that one measurement element lies closer to the edge of the membrane, whilst the other measurement element is situated closer to the centre of the membrane. The output signals of the first and second measurement element, for example resistance changes of the first and second measurement element, are evaluated in a common manner, such that the two measurement elements together detect a differential pressure acting on the membrane, i.e. the pressure difference between the pressures prevailing on both membrane surfaces, and thereby simultaneously compensate the influence of the system pressure acting on both sides or surfaces of the membrane. A pressure difference between the two sides or the two opposite surfaces of the membrane leads to a deflection of the membrane towards one side, which may be detected by the two measurement elements in the form of strain changes or stress changes. If such a pressure sensor is arranged in a system, for example a hydraulic system, a system pressure further acts on both sides of the membrane and the surrounding carrier, which may adulterate the measurement result. The influence of the system pressure may be compensated by way of the inventive arrangement of the first and second measurement element and the evaluation of their output signals.

This compensation is based on the recognition that the differential pressure acting on the membrane, in the edge region of the membrane and in the middle- or central region of the membrane, produces stresses or stress changes with a different polarity and with essentially the same amplitudes. The influence of the system pressure which acts equally on both sides of the membrane and on the end-sides of the carrier on the periphery of the membrane, however causes stresses or stress changes in the central- and edge region of the membrane, which have amplitudes of essentially the same magnitude and the same polarity. There is a neutral region between the central- and edge region, in which no stresses or deformations may be detected on account of the influence of the differential pressure. These different influences of differential- and system pressure on the deformation or occurring stresses of the membrane permit the compensation of the influence of the system pressure on the differential pressure measurement by way of a suitable arrangement of the measurement elements on the membrane, and a suitable evaluation or circuiting of the output signals of the measurement elements. For this, the two measurement elements are arranged in the regions the membrane which react differently to the pressures, i.e. distanced to the edge of the membrane to a different extent.

According to the invention, thus one may do away with compensation resistances arranged on the substrate. This, on the one hand permits the pressure sensor to be designed smaller, since the substrate, or the carrier does not have to be designed so large, that the compensation resistances may be arranged adequately far from the membrane. Furthermore, the arrangement according to the invention has the advantage that the first as well as the second measurement element react to deflections of the membrane on account of changes of the differential pressure. This means that both measurement elements actively take part in the measurement of the differential pressure. There are no longer any compensation resistances which are merely provided for compensating the system pressure, but do not react to the differential pressure. In this manner, the passive resistance in the circuit is reduced on differential pressure measurement, so that higher measurement accuracy is achieved.

Advantageously, the at least one first measurement element is arranged in an edge region of the membrane, and the at least one second measurement element is arranged in a central region or in a neutral region of the membrane which is situated between the edge- and central region. Alternatively, in a further preferred arrangement, the at least one second measurement element is arranged in a central region of the membrane, and the at least one first measurement element is arranged in an edge region or in a neutral region of the membrane which is situated between the edge region and the central region. This arrangement ensures that the first and the second measurement elements are distributed on the membrane, such that the influence of the system pressure on the output signals of the two measurement elements is different. In the case that the first measurement element or the first measurement elements are arranged in the edge region of the membrane, and the second measurement element or the second measurement elements are arranged in the central region of the membrane, the stresses or stress changes occurring on account of the system pressure and are detected by the first and the second measurement elements, have the same polarity, whilst the stress changes have different polarities on account of the differential pressure at both measurement elements or both groups of measurement elements. If one of the measurement elements is arranged in the neutral region, the differential pressure has no influence on this measurement element whatsoever, whilst it has an influence on the other measurement element or the other groups of measurement elements which are arranged outside the neutral region. However, the system pressure which acts on the membrane also has an influence on the measurement element in the neutral region of the membrane. It is thus possible with a suitable circuiting of the output signals of the first and second measurement elements or by way of the suitable evaluation of the exit signals, to detect the differential pressure and the system pressure or to compensate the influence of the system pressure on the detected differential pressure between both sides of the membrane.

In each case four first measurement elements and four second measurement elements are advantageously arranged on the membrane, which are connected to one another into a bridge circuit. This means that in each case the four first measurement elements and the four second measurement elements are circuited to one another in a preferably common bridge circuit.

The four first and the four second measurement elements thereby are preferably in each case designed or arranged, such that two of them have an output signal with a positive polarity and two of them have an output signal with a negative polarity. This means two first measurement elements have an exit signal with a positive polarity, and two second measurement elements have an output signal with a negative polarity. Accordingly, two second measurement elements could have an output signal with a positive polarity, and the two other second measurement elements an output signal with a negative polarity. This arrangement permits a simple common evaluation of the output signals of the first and second measurement elements. Thus in a bridge circuit, in which the first and second measurement elements are circuited to one another, for example in a Wheatstone bridge circuit, the output signals with a negative polarity may be very easily subtracted from the output signals with a positive polarity. One does away with complicated evaluation electronics which carry out these computation operations, and rather, the necessary additions and subtractions may be realised in a very simple manner in a simple bridge circuit, in which for example accordingly the resistance changes of the measurement elements may be subtracted from one another on account of their different polarities.

The output signals with different polarities may either be achieved by way of a different design or different arrangement of the measurement elements. With piezoresistive measurement elements which may be produced by way of doping the semiconductor material of the membrane in this, a change in the polarity of the output signal may be achieved by way of arranging two measurement elements rotated by 90° to the two other measurement elements, in the plane of the membrane. The measurement elements produced by doping always detect a total stress condition at the respective membrane location. This means that the measurement elements rotated by 90° also detect the same total stress condition as the other measurement elements, only their output signal has a reverse polarity. With the use of strain measurement elements which are deposited onto the membrane surface, for example bonded on, it is possible to use different strain measurement elements, specifically two strain measurement elements, which with a strain have an output signal with a positive polarity, and two measurement elements which with compression have an output signal with a positive polarity. If these strain measurement elements are arranged in the same direction, i.e. along the same axis of the membrane, they detect the same strain changes of the membrane in this direction, but the measurement element which on compression delivers a positive output signal, will have an output signal with a reverse polarity compared to the measurement element which on compression has a positive polarity.

The membrane is furthermore preferably designed such that along a first axis, it has different deformation behaviour with a pressure impingement than along a second axis extending normally to the first axis. This arrangement is advantageous with the use of bi-directional measurement elements, i.e. of measurement elements which detect a total stress condition in both axis directions of the membrane plane. By way of a design in a manner such that the membrane has different deformation behaviour along its two axes normal to one another, in particular one succeeds in the influence of the system pressure on the deformation or stresses of the membrane being different along the two axes. The system pressure which acts on both membrane surfaces normal to the membrane surface, has no direct influence on the reading of the differential pressure, since this pressure acts in the same manner on both surfaces of the membrane. The system pressure has essentially an influence on the measurement result, only to the extent that it acts on the end-faces of the carrier or substrate at the edge of the membrane in a direction parallel to the membrane surface. If then, the membrane is designed such that it has a different deformation behaviour along the two axes, the forces which act on the edges of the substrate and which act on the membrane in a direction parallel to its surface, lead to different stresses along the two axes of the membrane surface normal to one another, on account of the differently long edges. Advantageously, the stresses or forces in the one direction are significantly larger than in the other direction, so that the low forces may be neglected. This permits stress changes to be able to be detected on account of the system pressure also with bi-directional measurement elements in the middle or in the central region of the membrane. Even if the previously described design of the membrane is particularly advantageous with the use of bi-directional measurement elements, it may also be applied to unidirectional measurement elements.

The first and second measurement elements are advantageously connected to one another into a common bridge circuit, for example a Wheatstone bridge circuit. This has the advantage that the sensor only emits an output signal which is proportional to the differential pressure to be detected. This output signal is already corrected from the influence of the system pressure acting on both sides of the membrane. It is therefore not necessary to determine the differential pressure and system pressure independently of one another, and to subsequently process the two respective signals such that the influence of the system pressure on the detected differential pressure value is compensated. However, it is also possible with the design according to the invention, to provide connection points in a common circuiting of the first and second measurement elements, at which a signal which is proportional to the system pressure may be tapped, in order to be able to also determine the system pressure with regard to numbers.

The first and the second measurement elements are particularly preferably connected to one another in a Wheatstone bridge circuit, wherein in each case one of the first and one of the second measurement elements are arranged connected in series in each branch of the bridge circuit. In this manner, the output values of the first and the second measurement element add in each branch of the bridge circuit. In the case of measurement resistances, thus for example the resistances of the first and the second measurement element add in each branch of the bridge circuit.

Preferably, two measurement elements which have output signals with a different polarity are connected in series in each branch of the bridge circuit. This permits the output signals of the measurement elements connected in series to be subtracted in the branch of the bridge circuit.

Preferably, the measurement elements are arranged in a region or regions of the membrane, in which the largest deformation occurs when impinged by pressure. As mentioned above, the membrane may be designed such that it has a different strain- or deformation behaviour along two axes normal to one another. In this case, the measurement elements are arranged for example along a zone, in which the greatest deformation behaviour of the membrane occurs with a pressure impingement. In this manner, the sensitivity and measurement accuracy of the pressure sensor is increased. Furthermore, the measurement elements are also arranged in the edge region of the membrane, where the largest deformations or stresses occur given a pressure impingement of the membrane.

A different deformation- or strain behaviour of the membrane on pressure impingement along the two axes normal to one another may for example be achieved by way of the membrane in the direction of the second axis having a greater length than in the direction of the first axis normal to the second axis. Such a membrane formed in an elongate manner, which is firmly clamped in the carrier, has such a deformation behaviour with pressure impingement, that the stresses in the direction of the first, i.e. short axis are larger than in the direction of the second, i.e. long axis. In particular, the influence of the system pressure which acts on the edges of the carrier or of the substrate thus leads to different stresses or strains along the two axes of the membrane. The measurement elements are preferably arranged in the direction of the short axis and where appropriate are aligned such that they detect the stress- or strain changes in the direction of the short axis.

Such a membrane with different axis lengths may for example be designed rectangularly or also elliptically, or in any other shape with different axis lengths.

The length ratio of the two lengths of the membrane in the direction of the second and first axis lie between 1.2 and 4, particularly preferably at about 2.5. With these length ratios, one succeeds in the stresses occurring with pressure impingement being significantly larger in the direction of the first, i.e. shorter axis, than in the direction of the long axis.

The first and second measurement elements are usefully arranged in the direction of the second axis seen in the middle region of the membrane. With a membrane with a different length in the direction of the two axes normal to one another, the second axis is that axis which has the greatest length. This means that the measurement elements are arranged in a zone which is situated essentially in the middle region of the long axis, and extends in the direction of the short axis from one side of the membrane to the opposite side of the membrane. This is the region in which the largest stresses or deformations occur with a pressure impingement of the membrane.

The membrane is particularly preferably designed rectangular with two differently long sides or axes, by which means one succeeds in uniform stresses or stress changes prevailing in the middle region of the long axis, in which preferably the measurement elements are arranged, given a pressure impingement, and these may be detected by all measurement elements. With the use of a semiconductor substrate as a material for the membrane as has been described above, the membrane formed rectangularly with different edge lengths is preferably arranged such that its edges extend in <110>-direction.

A further possibility of designing a membrane with a different deformation behaviour in the direction of two axes normal to one another is by way of designing the membrane differently thick in different regions, so that it has a different deformation behaviour in different directions. Thereby, the membrane is preferably likewise designed such that given a pressure impingement, larger stresses in the membrane occur in the direction of the first axis than in the direction of a second axis normal to the first axis. The arrangement of the measurement elements is then usefully effected as already described above, in the direction of the axis in which the greatest deformation or stress occurs with a pressure impingement, in particular by way of the effect of the system pressure.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 2:
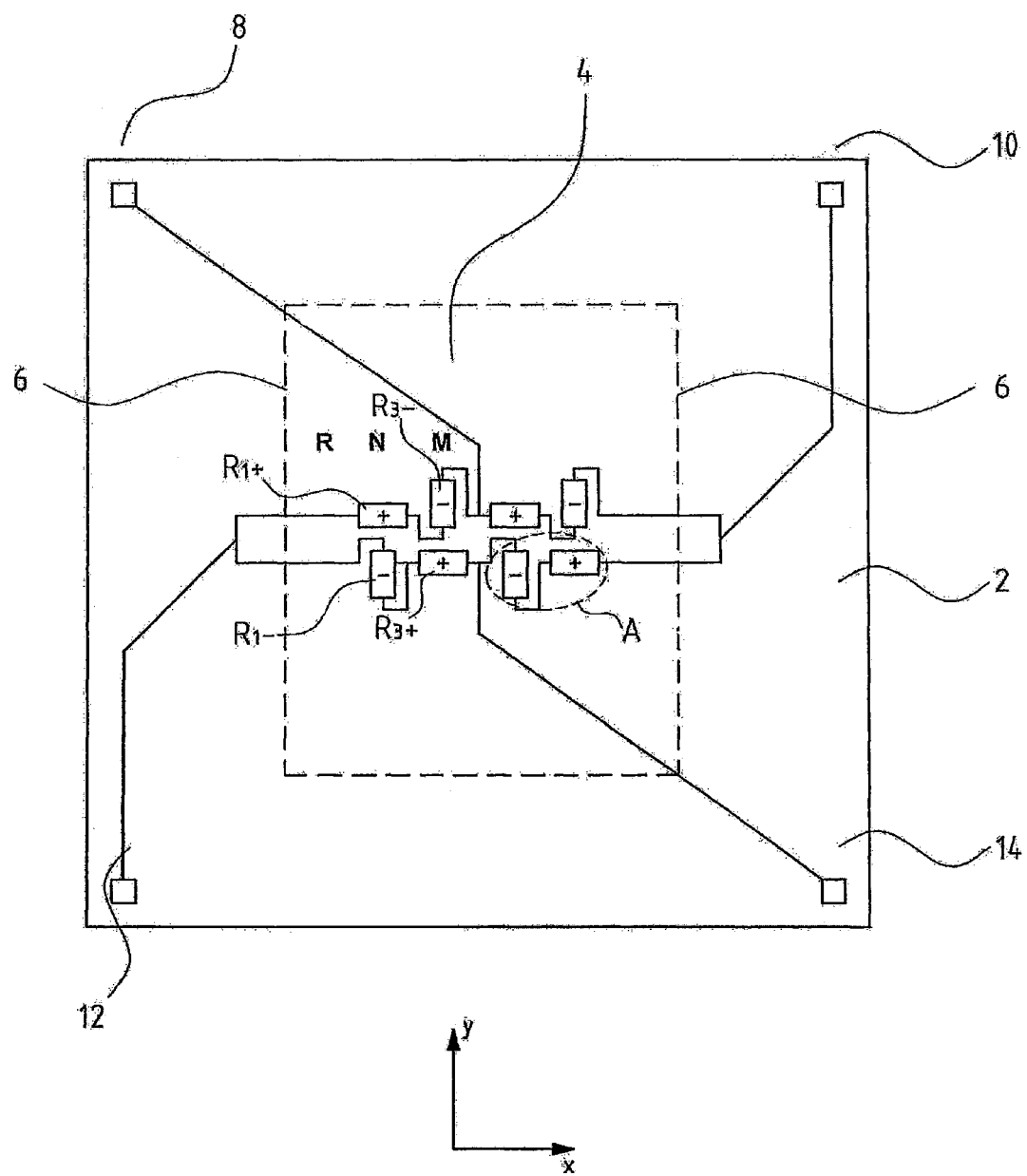
Figure 3:
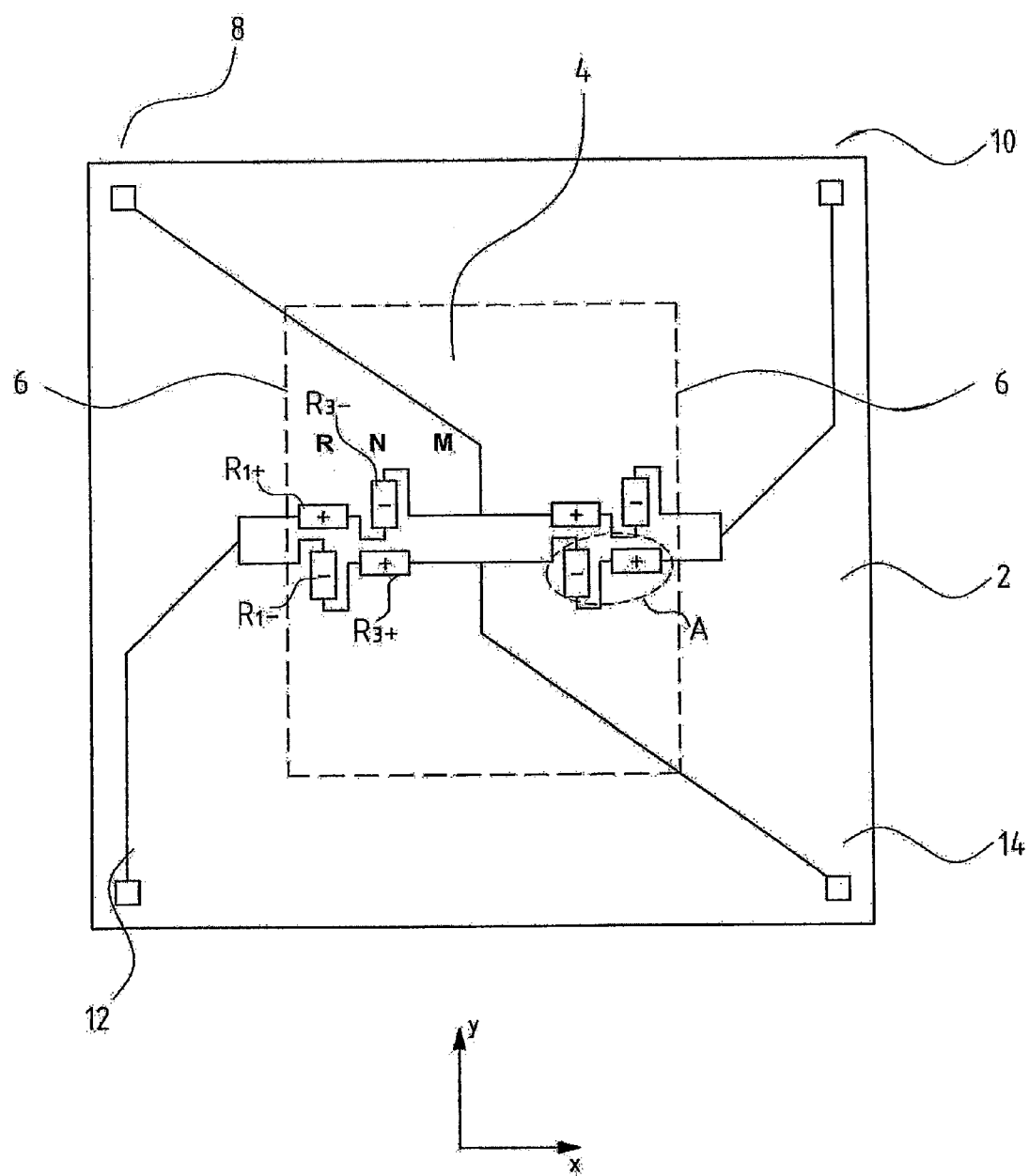

The pressure sensor according to the invention explained by way of the figures comprises a carrier or a substrate 2 of a semiconductor material, in whose middle region a rectangular membrane 4 is formed as one piece with the carrier 2 by way of thinning. The membrane is designed such that in the direction of the axis y, it has a greater edge length than in the direction of the axis x. The membrane in a known manner may be impinged from both surfaces with a pressure, in order to be able to determine the differential pressure between the two pressures prevailing at the opposite surfaces of the membrane, on account of the deflection of the membrane. For this, eight measurement elements in the form of measurement resistances are arranged on the membrane. With regard to the embodiment examples according to FIG. 1 to 3, the measurement resistances are formed by way of doping the semiconductor material as piezoresistive elements directly in the membrane surface. Four measurement resistances $R_1$ are arranged closer to the long sides 6 lying opposite one another.

Four further, second measurement resistances $R_3$ are arranged further distanced from the edges or corners of the membrane 4. All eight measurement resistances $R_1$ and $R_3$ are arranged along a strip in the direction of the short axis x of the membrane in roughly the middle of the long sides 6. This, with the shown rectangular membrane with differently long side edges, is the region in which the largest stresses occur given a pressure impingement. The stresses in the direction of the axis y are significantly smaller.

Figure 1:
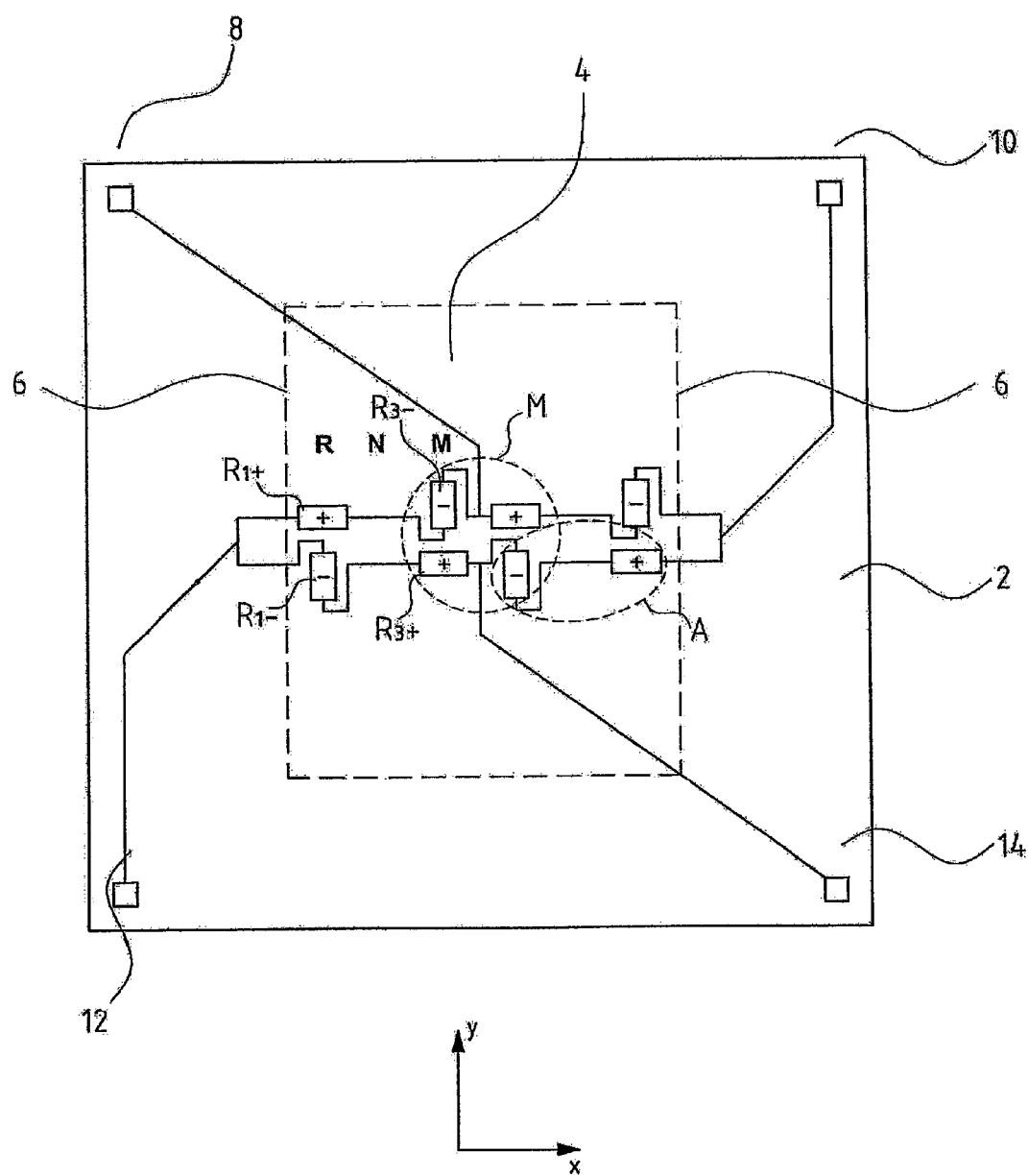
FIG. 1 a schematic plan view of a pressure sensor designed according to the invention, according to a first embodiment, FIG. 2 a schematic plan view of a pressure sensor designed according to the invention, according to a second embodiment, FIG. 3 a schematic plan view of a pressure sensor designed according to the invention, according to a third embodiment, FIG. 4 a schematic plan view of a pressure sensor designed according to the invention, according to a fourth embodiment, FIG. 5 a schematic plan view of a pressure sensor designed according to the invention, according to a fifth embodiment, FIG. 6 a schematic plan view of a pressure sensor designed according to the invention, according to a sixth embodiment, FIG. 7 schematically, the circuiting of the measurement elements of the pressure sensor according to FIG. 1 to 6, FIG. 8 the course of the stress in the membrane on account of a differential pressure acting on the membrane, FIG. 9 the course of the stress in the membrane on account of a system pressure acting on both sides of the membrane and FIG. 10 schematically, the stresses on account of the system pressure, at three positions of the membrane, FIG. 11 schematically, the stresses on account of the differential pressure, at three locations of the membrane.
Figure 6:
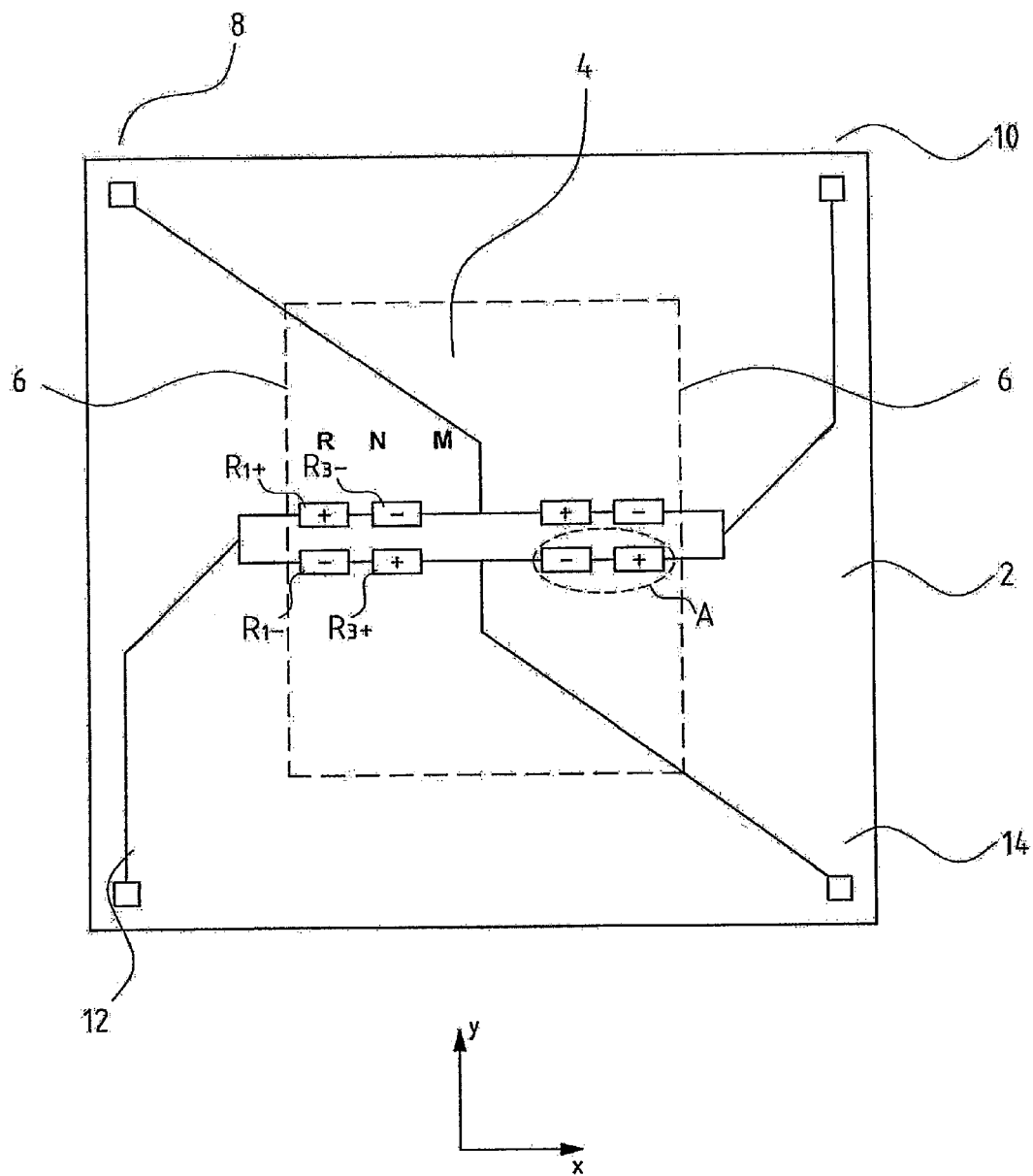

In each case four measurement resistances $R_1$ and measurement resistances $R_3$ are provided with the embodiment examples according to FIGS. 1 and 6, of which in each case two $R_{1-}$ and $R_{3-}$ have an output signal with a negative polarity, and the two others $R_{1+}$ and $R_{3+}$ have an output signal with a positive polarity. This, with the measurement elements in the form of measurement resistances, means that with a change of stress, the resistance of the measurement resistances reduces with a negative output signal, whilst it increases with the measurement resistances with a positive output signal. With the measurement resistances shown in FIG. 1 to 3, as mentioned above, it is the case of piezoresistive measurement elements which are produced by way of doping in the semiconductor substrate of the membrane 4, for example a silicon monocrystal with surfaces in the 100-level, wherein the measurement elements or the strain recorders $R_1$ and $R_3$ are n-doped. With these doped measurement recorders, the differing polarities of the output signal are achieved by way of the measurement elements being directed rotated by 90° to one another in the membrane surface. This is represented in the FIG. 1 to 3, in which the measurement elements $R_{1-}$ and $R_{3-}$ are directed in the direction of the y-axis, and the measurement elements $R_{1+}$ and $R_{3+}$ are directed in the direction of the x-axis. The doped measurement recorders, as are used with the embodiment examples according to FIG. 1 to 3, always measure a total stress condition in the direction of the x- and the y-axis. For this reason, it is advantageous with these measurement recorders, for the membrane to be designed in the described rectangular manner with two differently long side edges, so that the stresses acting on the measurement elements in the direction of the x-axis are larger than the stresses acting in the direction of the y-axis.

Figure 4:
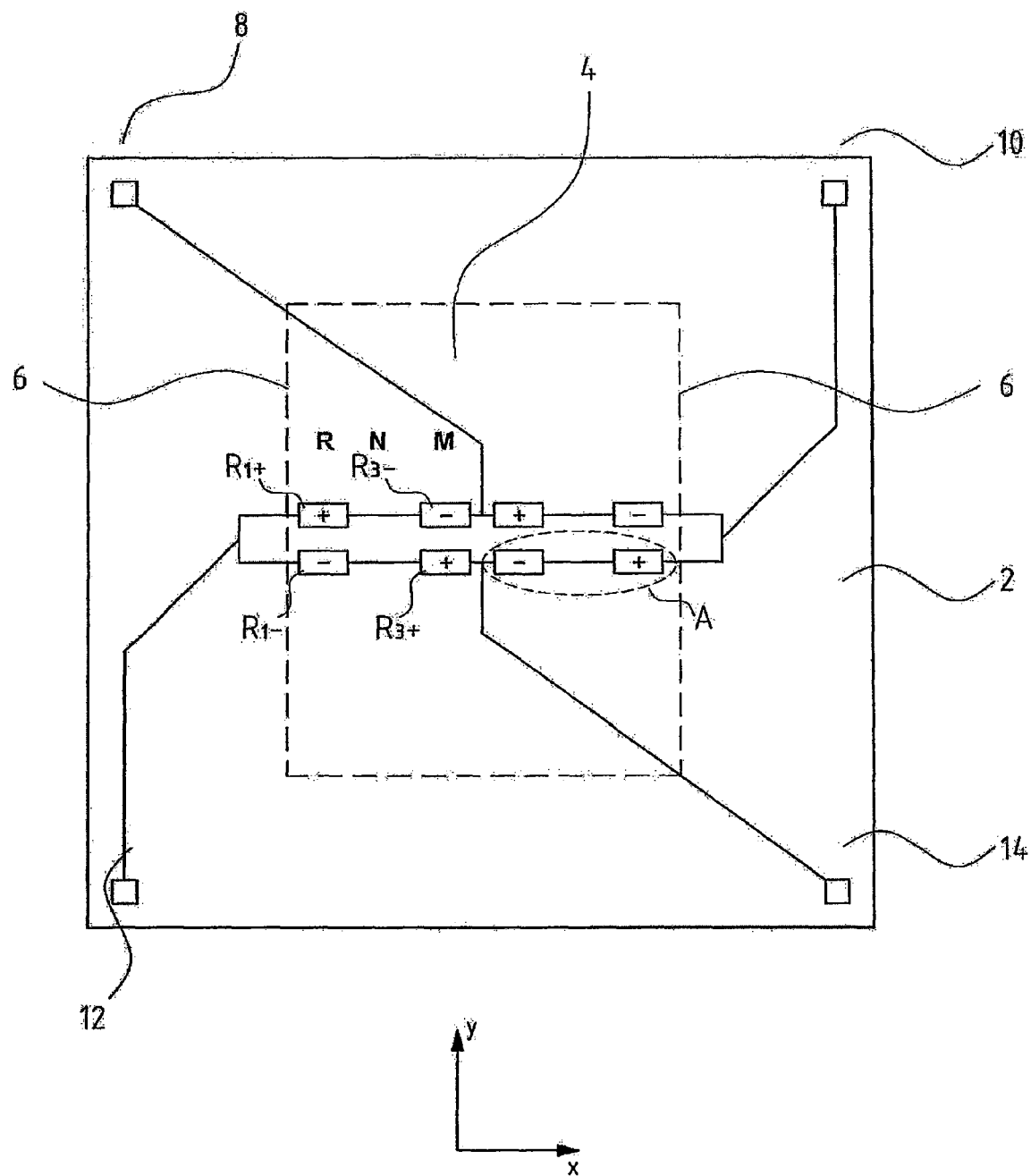
Figure 5:
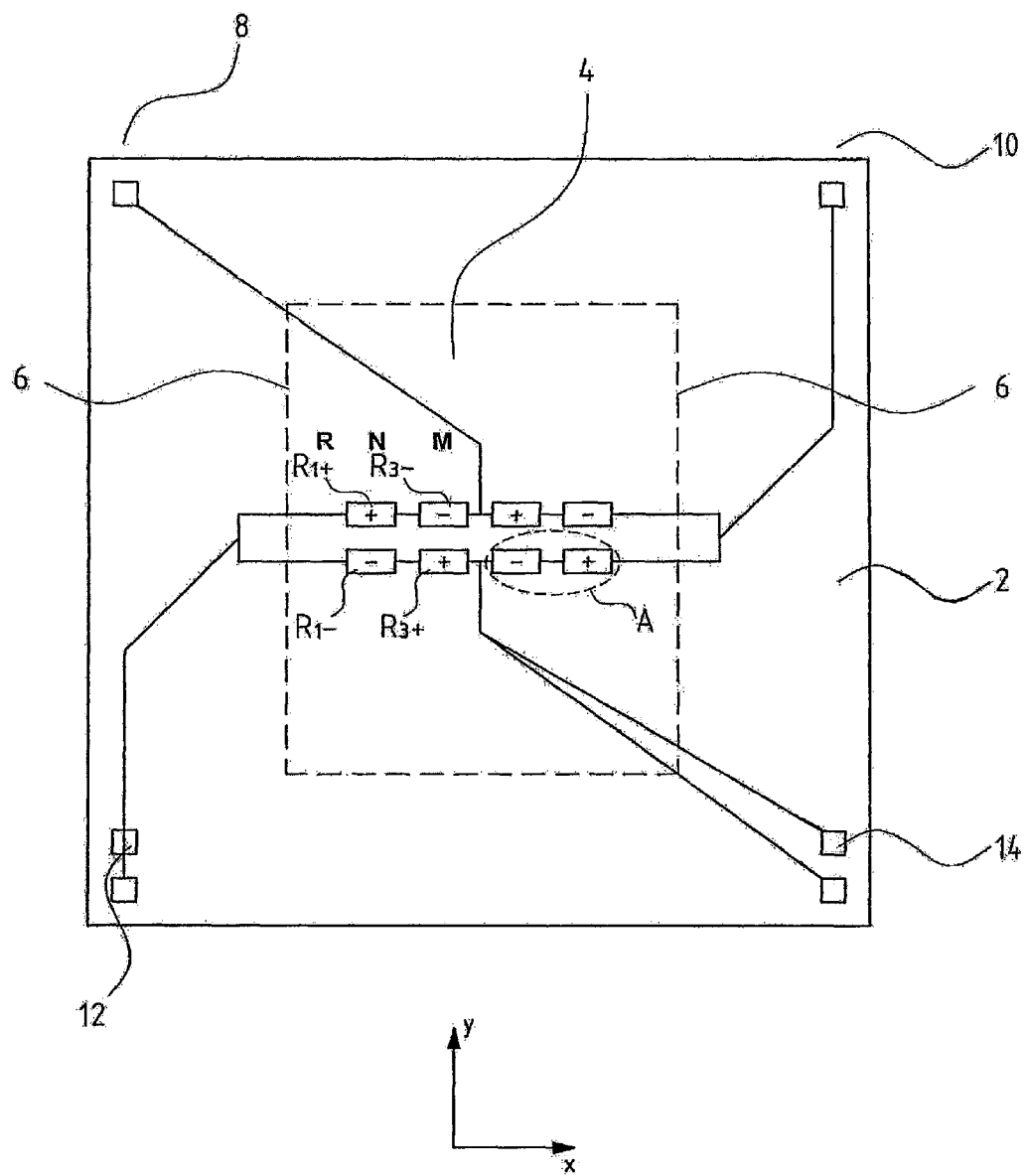

With the embodiment examples according to FIG. 4 to 6, strain-measurement strips for example of polysilicon, deposited on the surface of the membrane, are applied. The change of polarity with these strain measurement strips may be achieved by way of using strain measurement strips which increase their measurement resistance on straining, and using those which reduce their measurement resistance on straining, i.e. would increase their measurement resistance on compression, as second strain measurement strips. In this manner, with strain measurement strips, one may also realise an arrangement as is shown in the FIGS. 4 to 6, with which one applies measurement resistances $R_1$ and $R_3$ which have a negative output signal with strain, and measurement resistances $R_{1+}$ and $R_{3+}$ which have a positive output signal with strain.

The arrangement or the design of the measurement resistances $R_1$ and $R_3$ with a different polarity has the purpose of being able to subtract the signals of the individual measurement resistances from one another in the circuit. This means that the computation of the output signals of the individual measurement resistances $R_1$ and $R_3$ may be realised in a simple bridge circuit. Thereby, as is explained by way of FIG. 7, it is important for a measurement resistance with a positive output signal, and a measurement resistance with a negative output signal, to be arranged in each branch of the bridge circuit. Thereby, the allocation of positive and negative output signals with the measurement resistances $R_1$ and $R_3$ may be the other way round to those in FIG. 1 to 6.

Furthermore, the FIGS. 1 to 6 show three different arrangements of the measurement resistances $R_1$ and $R_3$ along the axis x. With the embodiment examples according to FIGS. 1 and 4, the outer measurement resistances $R_1$ are arranged directly on the edge region R of membrane, whilst the measurement resistances $R_3$ are arranged in the middle region or the central region M. With the embodiment according to FIGS. 2 and 5, the outer measurement resistances $R_1$ are arranged in a neutral region N which is situated in the direction of the axis x between the edge region R and the middle region M of the membrane. With the third arrangement possibility according to FIGS. 3 and 6, the outer measurement resistances $R_1$ are arranged in the edge region R, and the inner measurement resistances $R_3$ in the neutral region N of the membrane 4. The measurement principle resulting from these arrangements of the measurement resistances $R_1$ and $R_3$ is explained later by way of the FIGS. 8 to 13.

Figure 7:
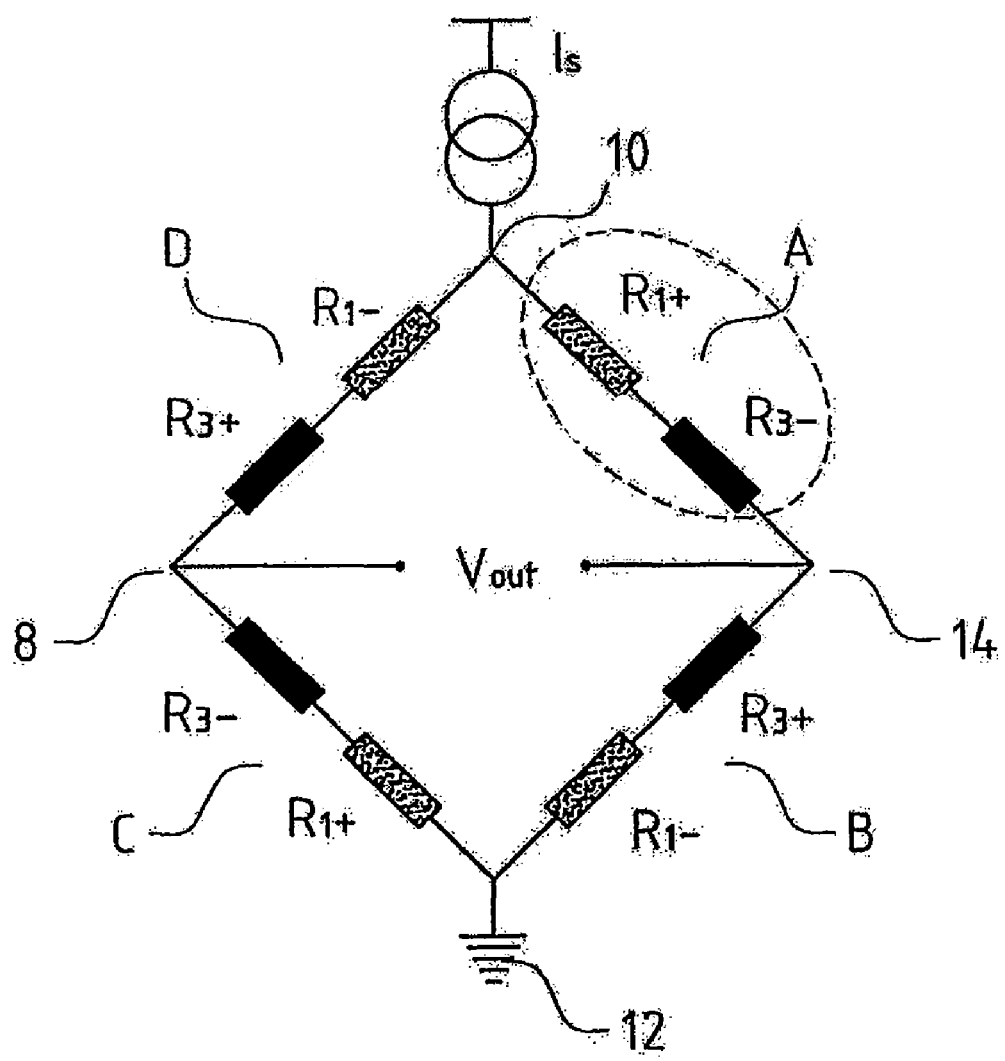

The four measurement resistances $R_1$ and the four measurement resistances $R_3$ are connected to one another into a common bridge circuit according to FIG. 7, with the embodiment examples according to FIG. 1 to 6. Accordingly, four electrical connections 8, 10, 12 and 14 are arranged on the substrate. As is represented by the strip conductors indicated in FIG. 1 to 6, as well as the circuit in FIG. 7, the eight measurement resistances $R_1$ and $R_3$ are connected into a Wheatstone bridge circuit such that a measurement element $R_1$ which is arranged closer to the edge region of the membrane 4, and a measurement element $R_3$ which is arranged closer to the central or middle region of the membrane 4, are connected to one another in each of the four branches A, B, C and D. The measurement elements $R_1$ and $R_3$ in the branches A, B, C, D of the bridge circuit are in each case connected in series. As explained previously, in each case a measurement resistance $R_{1+}$ or $R_{3+}$ with a positive output signal, and a measurement resistance $R_{1-}$ or $R_{3-}$ with a negative output signal are arranged connected in series, so that the output signals of the two measurement resistances arranged in the same branch of the bridge circuit are subtracted on account of the different polarity. When in the description, one speaks of output signals of the measurement resistances, it is here actually the case of the resistance changes occurring on account of the stress- or strain changes, which are negative at the resistances $R_{1-}$ and $R_{3-}$, and are positive at the measurement resistances $R_{1+}$ and $R_{3+}$. The branch A is for example represented by way of the dashed boundary also in FIG. 1 to 6. A measurement resistance $R_{1+}$ with a positive output signal and which is situated closer to the edge of the membrane, and a measurement resistance $R_{3-}$ with a negative output signal and which is situated closer to the middle of the membrane 4, are arranged in the branch A. The measurement resistances $R_{1+}$ and $R_{3-}$ lying opposite in a point-symmetrical manner to their middle point are accordingly arranged in branch C of the bridge circuit. The resistances $R_{3+}$ and $R_{1-}$ are arranged in the same manner in each case in the branches B and D of the bridge circuit.

A measurement current $I_S$ is applied to the electrical connections 10 and 12. An output voltage $V_{out}$ proportional to the differential pressure acting on both membrane surfaces may be tapped between the electrical connections 8 and 14. By way of the inventive arrangement of the measurement elements or measurement resistances $R_1$ and $R_3$ in the bridge circuit shown in FIG. 7, on determining the differential pressure on account of the deflection of the membrane, one takes into account the system pressure acting on both membrane sides and on the substrate 2 at the periphery of the membrane 4, and its influence is compensated accordingly, so that the output signal $V_{out}$ is already cleaned from the influence of the system pressure.

Figure 8:
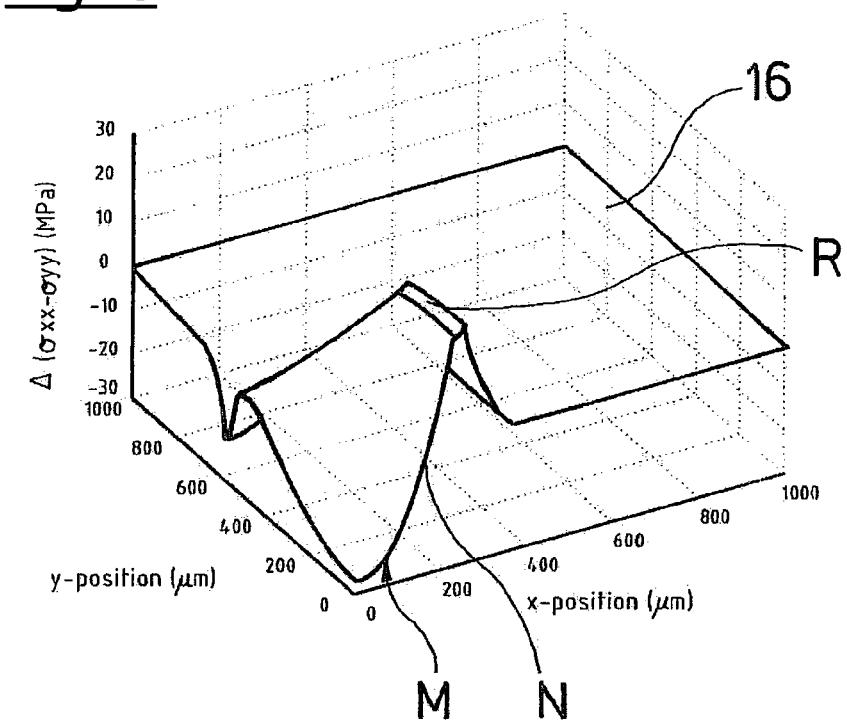
Figure 9:
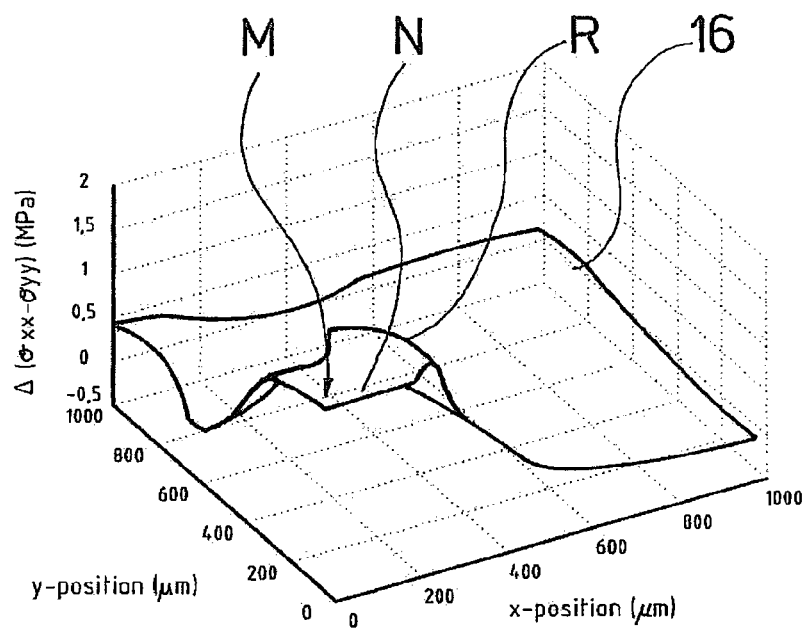

This compensation is based on a principle explained by way of FIGS. 8 and 9. FIGS. 8 and 9 show stress diagrams in which the change of the total stress $\Delta(\sigma_{XX}-\sigma_{YY})$ is plotted against the axis directions x and y of the membrane 4. The shown diagrams thereby in each case show a quarter of the membrane 4, i.e. the x- and y-coordinates plotted in the diagram axes start counting from the middle point of the membrane. FIG. 8 shows the stresses or stress changes which are caused by the differential pressure acting on the membrane 4 between both surfaces. Thereby, one may recognise that the stresses or stress changes due to the differential pressure, in the region of the edge R, have a reverse polarity to the stress changes in the central- or middle region M of the membrane. On account of the differential pressure or on account of changes of the differential pressure, no changes of stress occur in the neutral region N which is situated between the edge region R and the middle region M of the membrane (see FIG. 1 to 6). The zero-crossing of the curve between the edge region R and the middle region M lies in this point. The amplitude in the regions R and M is essentially equal. The measurement resistances $R_1$ are arranged in the edge region R of the membrane, as shown in FIG. 1, whilst the measurement resistances $R_3$ are arranged in the middle region M.

The absolute- or output- or system pressure which acts on both sides or surfaces of the membrane in the same manner, and on the end-edges of the carrier at the periphery of the membrane, produces stress changes in the membrane which have a course as is represented in the diagram according to FIG. 9. Here, one may recognise that the stress changes in the edge region R, in the neutral region N and in the middle region M of the membrane have essentially the same amplitude and the same polarity. The stress changes on account of the system pressure thus have a different polarity in the middle region M of the membrane, in which the measurement resistances $R_3$ are arranged, than the stress changes caused on account of the system pressure in this region M. These different polarities of the stress changes are used in the circuit of the measurement resistances $R_1$ and $R_3$ explained by way of FIGS. 1 to 7, to compensate the influence of the system pressure on the measurement result of the differential pressure.

Figure 10:
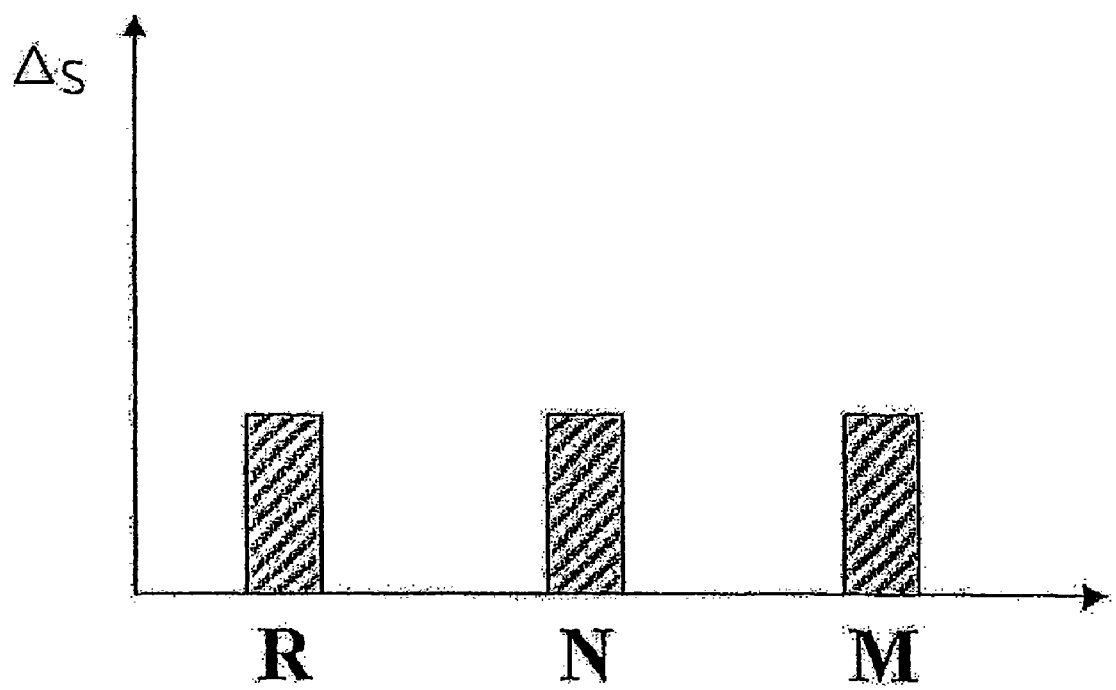
Figure 11:
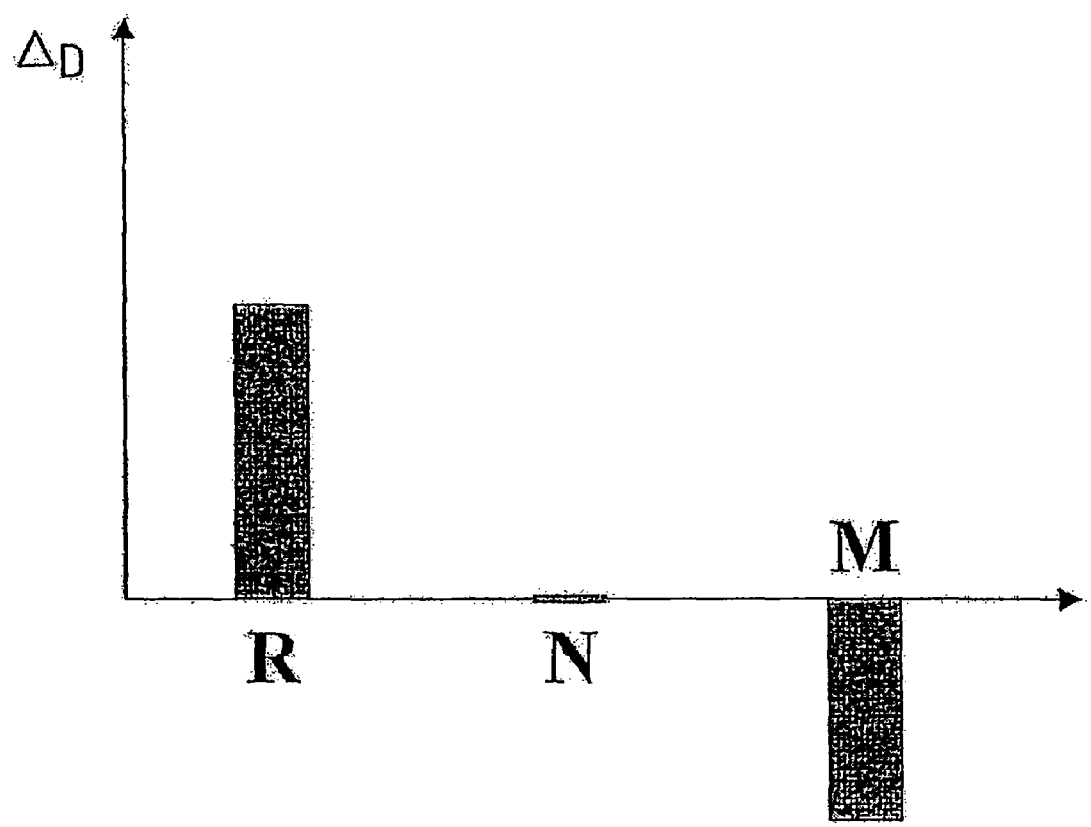

The compensation principle is now explained in more detail by way of FIG. 10 to 13. FIG. 10 shows the stress changes $\Delta_S$ at the edge region R, in the neutral region N, and in the middle region M of the membrane 4, on account of the influence of the system pressure, as described by way of FIG. 9. One may once again recognise in the schematic representation according to FIG. 10, that the stress changes $\Delta_S$ in the three regions R, N and M of the membrane 4 have essentially the same amplitude and the same polarity. FIG. 11 accordingly in a schematic representation shows the stress changes $\Delta_D$ in the edge region R, in the neutral region N and in the middle region M of the membrane 4, which are caused by the differential pressure acting on the membrane 4. As explained by way of FIG. 8, the stress changes have an opposite polarity on account of the differential pressure in the edge region R and in the middle region M, whilst no stress changes occur in the neutral region N on account of the differential pressure.

Figure 12:
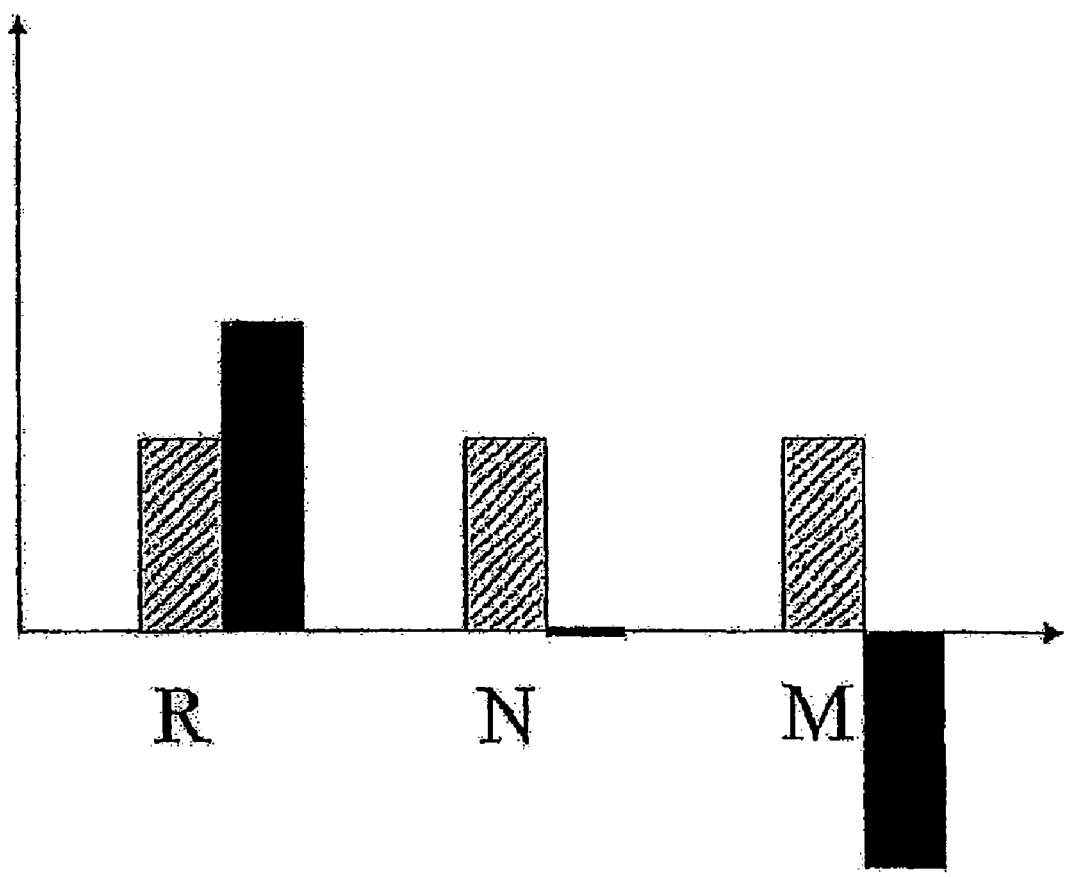
FIG. 12 schematically, the stresses on account of the system pressure and on account of the differential pressure, at three locations of the membrane FIG. 13 schematically, a combined signal and FIG. 14 a schematic plan view of a pressure sensor similar to that pressure sensor shown in FIGS. 1 and 4, with which addition connections are provided for reading out the system pressure.

The stress changes $\Delta_D$ and $\Delta_S$ according to FIGS. 10 and 11 are now represented in a common diagram in the diagram according to FIG. 12, in which one may recognise that the stress changes $\Delta_S$ and $\Delta_D$ have different polarities in the middle region M of the membrane 4, whilst they have the same polarity in the edge region R of the membrane 4. If the differential pressure impingement were to act on the membrane 4 in a reverse manner, this would be exactly the other way round, i.e. $\Delta_S$ and $\Delta_D$ would have different polarities in the edge region R and the same polarity in the middle region M.

Figure 13:
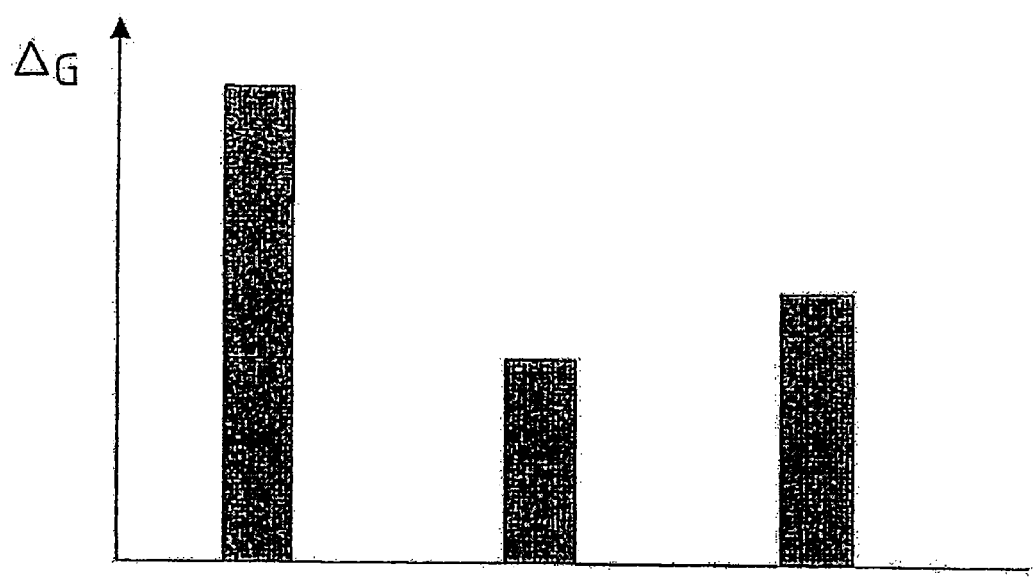

The signal change $\Delta_G$ which results by subtraction of the stress changes in the edge region R, in the middle region M and/or the neutral region N of the membrane 4 as is carried out in the previously mentioned Wheatstone bridge circuit in a branch, is represented schematically in FIG. 13. In the case that the measurement resistances $R_1$ are arranged in the edge region R and the measuring resistances $R_3$ in the middle region M of the membrane (according to FIG. 1 and FIG. 4), in the left bar in FIG. 13, one may recognise that with the subtraction of the stress changes $\Delta_S$ and $\Delta_D$ on account of the different polarity of the stresses $\Delta_D$ in the edge region R and in the middle region M, an addition of the magnitudes of the stress changes $\Delta_D$ in the edge region R and the middle region M occurs, whilst the influence of the system pressure $\Delta_S$ is compensated on account of the same amplitude and the same polarity in the edge region R and in the middle region M.

If the measurement resistances $R_1$ are arranged in the neutral region N and the measurement resistances $R_3$ in the middle region M (according to FIG. 2 and FIG. 5), then the signal change $\Delta_G$ occurs with the subtraction of the signals, which is represented by the middle bar in FIG. 13. Here too, the influence of the system pressure $\Delta_S$ is eliminated by subtraction, and $\Delta_D$ corresponds to the magnitude of the stress change $\Delta_S$ in the middle region M, since the stress change $\Delta_D$ is zero in the neutral region.

If the measurement resistances $R_1$ are arranged in the edge region R and the measurement resistances $R_3$ in the neutral region N of the membrane 4 (according to FIG. 3 and FIG. 6), then the signal change $\Delta_G$ arises, which is represented in the right bar in FIG. 12, when the signals $\Delta_D$ and $\Delta_S$ in the neutral region are subtracted from those in the edge region. Due to the same polarity and the same amplitude of the stress changes $\Delta_S$, their influence is eliminated, and $\Delta_G$ corresponds to the signal change on account of the differential pressure $\Delta_D$ in the edge region R. In this manner, the influence of the system pressure $\Delta_S$ may be eliminated or compensated by way of connecting the measurement resistances $R_1$ and $R_3$. The subtraction of the stress changes $\Delta_S$ and $\Delta_D$ in the individual regions of the membrane from one another is effected in that, as already previously described, the measurement resistances $R_1$ and $R_3$ in pairs have output signals with a different polarity, and are connected to one another in the Wheatstone bridge circuit according to FIG. 7.

Figure 14:
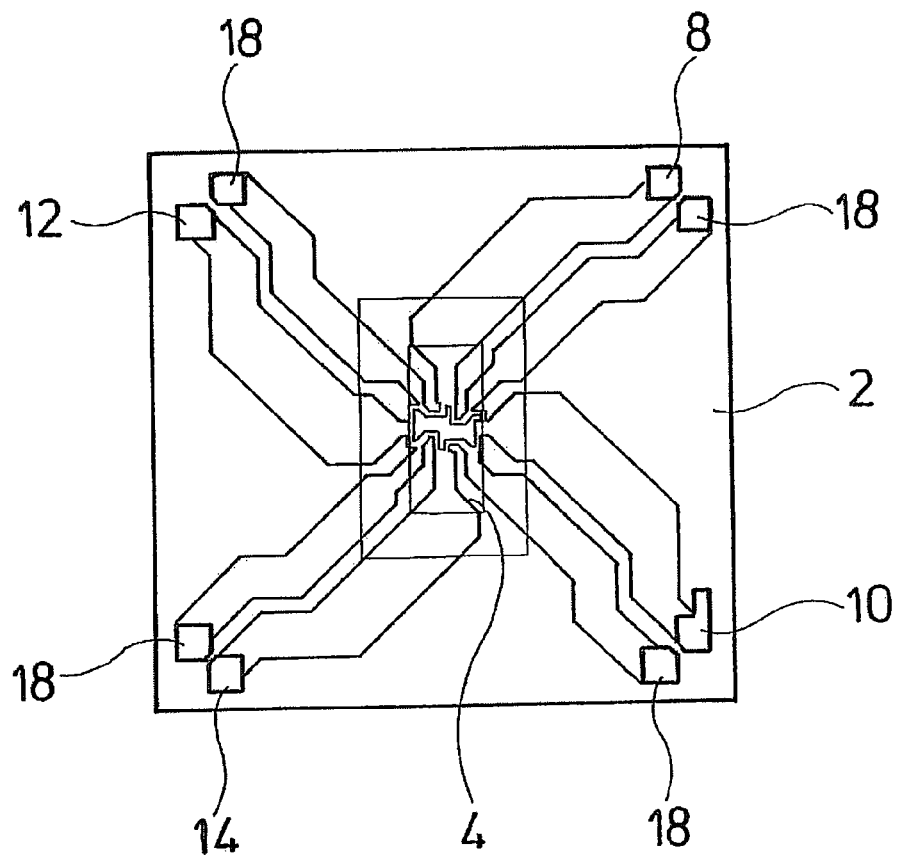

FIG. 14 shows a special embodiment of the invention with which the resistances $R_1$ and $R_3$ are connected according to the embodiment explained in the FIGS. 1 and 6. With the embodiment according to FIG. 14, in addition to the electrical connections 8, 10, 12, 14, four further connections 18 are provided, which in each case are applied between the resistances $R_1$ and $R_{3+}$ or $R_{3-}$ and $R_{1+}$ in the branches A, B, C and D of the measurement bridge according to one of the FIGS. 1 and 6. These electrical connections 18 may be used to also detect the system pressure as an individual variable, additionally to the compensated differential pressure detected by way of the electrical connections 8, 10, 12, 14.

In the shown example, the membrane 4 is designed in an elongate and rectangular manner. Alternatively, the membrane 4 may also be designed such that it is for example designed in an elliptical manner, wherein the long axis extends in the direction y and the short axis of the ellipse in the direction of the axis x. Furthermore, it is also possible to design the membrane in a different manner, for example by way of different thicknesses, such that given deformation, the stresses occurring in the direction of the axis x are larger than in the direction of the axis y. For the case that measurement resistances or measurement elements $R_1$ and $R_3$ are used which are in the position of only detecting the stresses in the direction of the axis x, the membrane may also be designed such that the stresses or stress changes occurring in the direction of the axes x and y on impinging with pressure are equally large, i.e. for example a square or round membrane may be used.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A pressure sensor with a carrier (2), which in an inner region comprises a membrane (4) on which at least one first measurement element ($R_{1-}$) for detecting a pressure impingement of the membrane (4) is arranged, wherein additionally, at least one second measurement element ($R_{3-}$) for detecting a pressure impingement of the membrane (4) is arranged on the membrane (4), wherein the first measurement element ($R_{1-}$) is spaced apart a first distance from the edge of the membrane (4) and the second measurement element ($R_{3-}$) is spaced apart a second distance from the edge of the membrane (4), the first and second distances being different, and the output signals of the first and the second measurement elements ($R_{1-}$, $R_{3-}$) are evaluated together in a manner to detect at least one of a differential pressure acting on the membrane (4) compensated by the influence of system pressure acting on both sides of the membrane (4) and a system pressure acting on both sides of the membrane (4).

2. A pressure sensor according to claim 1, wherein the at least one first measurement element ($R_{1-}$) is arranged in an edge region (R) of the membrane (4), and the at least one second measurement element ($R_{3-}$) is arranged in a central region (M) or in a neutral region (N) of the membrane (4) situated between the edge region (R) and the central region (M).

3. A pressure sensor according to claim 1, wherein the at least one second measurement element ($R_{3-}$) is arranged in a central region (M) of the membrane (4), and the at least one first measurement element ($R_{1-}$) is arranged in an edge region (R) or in a neutral region (N) of the membrane (4) situated between the edge region (R) and the central region (M).

4. A pressure sensor according to claim 1, wherein four first measurement elements ($R_{1-}$, $R_{1+}$) and four second measurement elements ($R_{3-}$, $R_{3+}$) are arranged on the membrane (4), which are connected to one another in a bridge circuit.

5. A pressure sensor according to claim 4, wherein each of the four first ($R_{1-}$, $R_{1+}$) and the four second measurement elements ($R_{3-}$, $R_{3+}$) are designed or arranged such that two ($R_{1-}$, $R_{3+}$) of the measurement elements have an output signal with a positive polarity, and two ($R_{1+}$, $R_{3-}$) of the measurement elements have an output signal with a negative polarity.

6. A pressure sensor according to claim 1, wherein the membrane (4) along a first axis (x) has a different deformation behavior upon pressure impingement than along a second axis (y) extending normal to the first axis (x).

7. A pressure sensor according to claim 1, wherein the at least one first ($R_{1-}$, $R_{1+}$) and at least one second ($R_{3-}$, $R_{3+}$) measurement elements are connected to one another in a common bridge circuit.

8. A pressure sensor according to claim 7, wherein the at least one first ($R_{1-}$, $R_{1+}$) and at least one second ($R_{3-}$, $R_{3+}$)

measurement elements are connected to one another in a Wheatstone bridge circuit, and wherein one of the first ($R_{1-}$, $R_{1+}$) and one of the second ($R_{3-}$, $R_{3+}$) measurement elements are arranged connected in series in each branch (A, B, C, D) of the bridge circuit.

9. A pressure sensor according to claim 8, wherein two measurement elements having output signals with a different polarity are connected in series in each branch (A, B, C, D) of the bridge circuit.

10. A pressure sensor according to claim 7, wherein the bridge circuit comprises electrical connections (18) which are used to detect the system pressure as an individual variable.

11. A pressure sensor according to claim 1, wherein the measurement elements ($R_1$, $R_3$) are arranged in a region of the membrane (4) in which the greatest deformation occurs during pressure impingement.

12. A pressure sensor according to claim 1, wherein the membrane (4) defines a first axis (x) and a second axis (y), and the membrane (4) in the direction of the second axis (y) has a greater length than in the direction of the first axis (x).

13. A pressure sensor according to claim 12, wherein the ratio of the lengths of the membrane (4) in the direction of the second axis (y) and in the direction of the first axis (x) is between 1.2 and 4, preferably at 2.5.

14. A pressure sensor according to claim 12, wherein the first and second measurement elements ($R_{1-}$, $R_{3-}$) seen in the direction of the second axis (y), are arranged in the middle region of the membrane (4).

15. A pressure sensor according claim 12, wherein the membrane (4) is designed in a rectangular manner.

16. A pressure sensor according to claim 1, wherein the membrane (4) is designed differently thick in order to have different deformation behavior in the directions of two axes (x, y).

* * * * *